United States Patent
Chen et al.

(10) Patent No.: US 8,459,859 B2
(45) Date of Patent: Jun. 11, 2013

(54) DECORATION PANEL

(75) Inventors: Yin-Ta Chen, Taipei (TW);
Kuang-Cheng Fan, Taipei (TW);
Shih-Wei Li, Taipei (TW)

(73) Assignee: Compal Electronics, Inc., Taipei (TW)

( * ) Notice: Subject to any disclaimer, the term of this patent is extended or adjusted under 35 U.S.C. 154(b) by 122 days.

(21) Appl. No.: 13/025,162

(22) Filed: Feb. 11, 2011

(65) Prior Publication Data

US 2011/0194305 A1 Aug. 11, 2011

Related U.S. Application Data

(60) Provisional application No. 61/303,319, filed on Feb. 11, 2010.

(51) Int. Cl.
*F21V 7/04* (2006.01)
(52) U.S. Cl.
USPC .......... 362/618; 362/603; 362/605; 362/609; 362/812; 40/541; 40/546

(58) Field of Classification Search
USPC ............ 362/600, 603, 605, 609, 812; 40/541, 40/546
See application file for complete search history.

(56) References Cited

U.S. PATENT DOCUMENTS

| | | | | |
|---|---|---|---|---|
| 6,885,360 B2 * | 4/2005 | Hara et al. | | 345/102 |
| 6,992,827 B2 * | 1/2006 | Sakai et al. | | 359/599 |
| 7,150,539 B2 * | 12/2006 | Chen et al. | | 362/235 |
| 7,175,324 B2 * | 2/2007 | Kwon | | 362/545 |
| 7,278,775 B2 * | 10/2007 | Yeo et al. | | 362/627 |
| 7,597,467 B2 * | 10/2009 | Itaya | | 362/601 |

* cited by examiner

*Primary Examiner* — Ali Alavi
(74) *Attorney, Agent, or Firm* — Jianq Chyun IP Office

(57) ABSTRACT

A light guide module capable of illuminating and being applied in a device for decoration is provided. The light guide module includes a reflective layer, a light guide with a plurality of diffusing particles, and a light source. The light guide has a side surface, a reflective surface and a light-exiting surface, thereby allowing a light from the light source to enter and reflect and exit the light guide respectively. The reflective layer is disposed on the reflective surface of the light guide for reflecting the light to the light-exiting surface. The light guide forms a portion of an outer surface of the device.

18 Claims, 5 Drawing Sheets

DECORATION PANEL

CROSS-REFERENCE TO RELATED APPLICATION

This application claims the priority benefit of U.S. provisional application Ser. No. 61/303,319, filed on Feb. 11, 2010. The entirety of the above-mentioned patent application is hereby incorporated by reference herein and made a part of this specification.

BACKGROUND OF THE INVENTION

1. Field of the Invention

The invention generally relates to a light guide module, in particular, to a light guide module serving as a decoration panel.

2. Description of Related Art

A product usually has an outer surface which can be formed by a decoration panel so as to provide required visual effects such as a pattern design, a logo presentation, and the like. Conventionally, the decoration panel can be painted with specific colors or printed with the required patterns or logo for achieving the required visual effect such as showing the logo. However, the painted colors and the printed patterns are difficultly seen if the ambient light is weak.

Accompanying with the development of electronic device, a decoration panel capable of illuminating can be achieved by using the light emitting design in the product for overcoming the aforesaid problem. For example, a backlight module of a display can be further used in the decoration panel. Accordingly, the pattern represented by the decoration panel is capable of illuminating, which facilitates various visual effects.

However, the backlight module of a display includes a plurality of optical plates or optical films for providing desirable display light source, which unfavorably increases the thickness of the decoration panel. That is to say, a decoration panel capable of illuminating still needs to be improved.

SUMMARY OF THE INVENTION

Accordingly, the invention is directed to a decoration panel capable of illuminating which has a thinned volume.

The invention is further directed to a decoration panel capable of illuminating which has simple elements and compacted volume.

The invention provides a decoration panel. The decoration panel includes a light guide and a reflective layer. The light guide includes a plurality of diffusing particles distributed therein and has a side surface, a reflective surface, and a light-exiting surface. A light enters the light guide through the side surface. The light-exiting surface is three dimensional and forms a portion of an outer surface of a housing. The reflective layer is disposed on the reflective surface of the light guide, for reflecting the light to the light-exiting surface.

According to an embodiment of the invention, the decoration panel further includes a light shielding pattern layer, disposed on the light-exiting surface, wherein the light shielding pattern layer has at least one opening.

According to an embodiment of the invention, the light guide has a plurality of protrusions located at the openings of the light shielding pattern layer.

According to an embodiment of the invention, the light shielding pattern layer is an ink pattern layer and is printed on the light guide.

According to an embodiment of the invention, the reflective surface of the light guide is substantially flat.

According to an embodiment of the invention, a thickness of the light guide is gradually increased from a first side of the light guide toward a second side opposite to the first side and a distance from the reflective layer to the light guiding plate is gradually decreased with the increase of the thickness of the light guiding plate. One of the first side and the second side contains the side surface.

According to an embodiment of the invention, the decoration panel can further include a film layer, wherein the light shielding pattern layer is disposed on the film layer. In addition, the decoration panel can further includes an adhesion disposed between the light guiding plate and the film layer and located at a periphery of the film layer so that an air gap is formed between the film layer and the light guide.

According to an embodiment of the invention, the light guide includes, for example, a first portion and a second portion connected to the first portion. A first refractive index of the first portion is greater than a second refractive index of the second portion and the diffusing particles are distributed within the second portion.

The invention further provides a light guide module capable of illuminating and being applied in a device for decoration. The decoration panel includes a light source, a light guide, and a reflective layer. The light guide includes a plurality of diffusing particles distributed therein, and has a side surface and a light-exiting surface. A light provided by the light source enters the light guide through the side surface. The light guide constitutes a portion of an outer surface of the device. The reflective layer is disposed on the light guide and opposing to the light-exiting surface, for reflecting the light to the light-exiting surface According to an embodiment of the invention, the light guide includes a first portion and a second portion connected to the first portion. A first refractive index of the first portion is greater than a second refractive index of the second portion. The plurality of diffusing particles is distributed within the second portion of the light guide.

According to an embodiment of the invention, a thickness of the light guide is gradually increased from a first side of the light guide toward a second side opposite to the first side and a distance from the reflective layer to the light guiding plate is gradually decreased with the increase of the thickness of the light guiding plate. One of the first side and the second side contains the side surface.

According to an embodiment of the invention, the light source is disposed beside the light guide on the first side or the second side.

According to an embodiment of the invention, the light-exiting surface is an uneven surface.

According to an embodiment of the invention, the decoration panel further includes a light shielding pattern layer, disposed opposite to the reflective layer, wherein the light shielding pattern layer has at least one opening.

According to an embodiment of the invention, the light guide has a plurality of protrusions located at the openings of the light shielding pattern layer.

According to an embodiment of the invention, the light shielding pattern layer is an ink pattern layer and is printed on the light guide.

According to an embodiment of the invention, the light guide has a substantially flat reflective surface facing to the reflective layer.

According to an embodiment of the invention, the decoration panel can further include a film layer, wherein the light shielding pattern layer is disposed on the film layer. In addition, the decoration panel can further includes an adhesion disposed between the light guiding plate and the film layer and located at a periphery of the film layer so that an air gap is formed between the film layer and the light guide.

In light of the foregoing, a plurality of diffusing particles is distributed in the light guide so that the decoration panel of the invention can have substantially evenly illuminating effect. In addition, merely the light shielding pattern layer is disposed on the light guide can the illuminating patterns be shown so as to reduce the volume of the decoration panel. Accordingly, the decoration panel of the invention is capable of illuminating and further has a thinned volume and a simple design.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
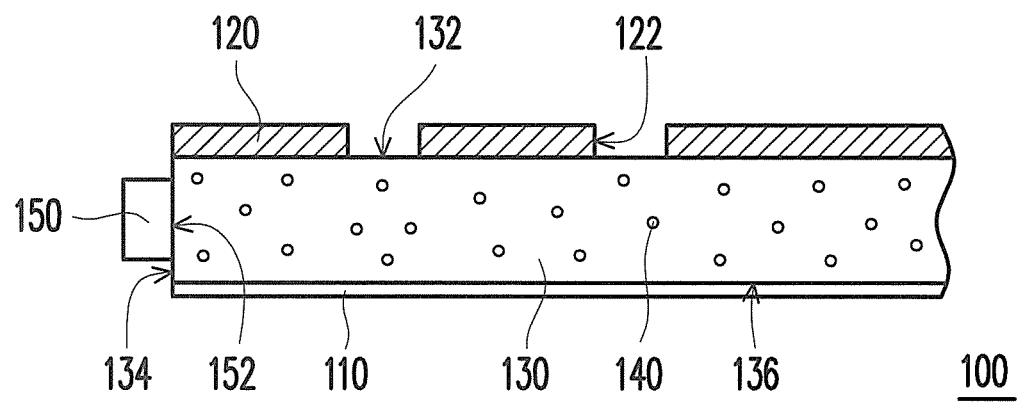
FIG. 1 schematically illustrates a cross-sectional view of a decoration panel according to a first embodiment of the invention.

Reference will now be made in detail to the present embodiments of the invention, examples of which are illustrated in the accompanying drawings. Wherever possible, the same reference numbers are used in the drawings and the description to refer to the same or like parts.

FIG. 1 schematically illustrates a cross-sectional view of a decoration panel according to a first embodiment of the invention. Referring to FIG. 1, a decoration panel 100 includes a reflective layer 110, a light shielding pattern layer 120, a light guide 130, a plurality of diffusing particles 140, and a light emitting device 150. The light shielding pattern layer 120 is opposite to the reflective layer 110 and has a plurality of openings 122. The light guide 130 is disposed between the reflective layer 110 and the light shielding pattern layer 120. The plurality of diffusing particles 140 is distributed within the light guide 130. The light guide 130 has a light-exiting surface 132, a side surface 134, and a reflective surface 136. The light emitting device 150 is disposed beside the side surface 134 of the light guide 130 and the reflective layer 110 is disposed on the reflective surface 136 of the light guide 130 for reflecting the light to the light-exiting surface 132. In the present embodiment, the light emitting device 150 acts as a light source and can be a light emitting diode, a light bar consisting of a plurality of light emitting diodes, a lamp such as a cold cathode fluorescence lamp, or the like. In addition, the light emitting device 150 is disposed beside the light guide 130 so that the decoration panel 100 has a thinned volume.

It is noted that the light emitting device 150 has a light emitting surface 152 substantially perpendicular to the reflective layer 110 so that a light beam emitted from the light emitting device 150 enters the light guide 130 through the side surface 134 of the light guide 130 and then emits from the light-exiting surface 132 of the light guide 130 through the openings 122. In addition, the light shielding pattern layer 120 in the present embodiment can be an ink pattern layer and be printed on the light-exiting surface 132 of the light guide 130 for representing the required patterns, wherein the light guide 130 can have a substantially flat light exiting surface 132 and the ink pattern layer is printed on the substantially flat light exiting surface 132.

Figure 2:
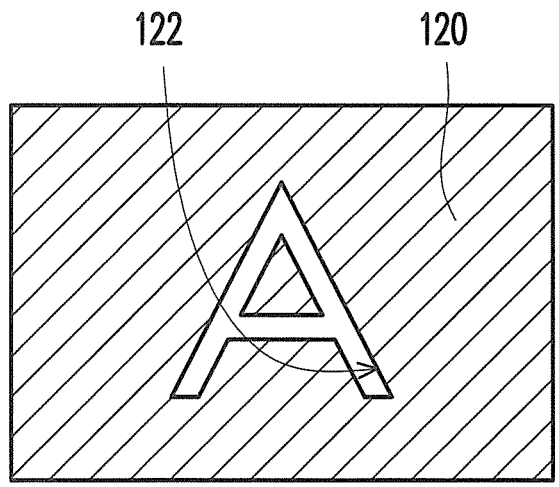
FIG. 2 schematically illustrates a top view of the decoration panel.

Furthermore, the openings 122 configured in the light shielding pattern layer 120 allow the light beam (not shown) emitted from the light emitting device 150 to emit from the light guide 130 therethrough so that the arrangement of the openings 122 facilitates to form an illustrating pattern or logo. Specifically, the amount of the openings 122 can be one or more, and the invention is not limited. For example, FIG. 2 schematically illustrates a top view of the decoration panel. Referring to FIG. 1 and FIG. 2 simultaneously, the openings 122 of the light shielding pattern layer 120 as shown in FIG. 2 forms a pattern "A", for example. The decoration panel 100 can show an illuminating pattern "A", which serves as an appearance of a product. That is to say, a designer can modify the arrangement of the openings 122 based on specific requirement to make the required pattern represented on the appearance of the product. Herein, the pattern "A" is taken as an example and is not intent to limit the arrangement of the openings 122 of the light shielding pattern layer 120. It is noted that the light shielding pattern layer 120 can be selectively omitted in other embodiments. In addition, the shielding pattern layer 120 and the substantially flat light exiting surface 132 of the light guide 130 can be served as a portion of an outer surface of a device when the decoration panel 100 is applied in a device for decoration.

The diffusing particles 140 are distributed within the light guiding plate 130. Specifically, when the light guiding plate 130 is formed by plastic material, the diffusing particles 140 are evenly mixed with the plastic material and the plastic material is subsequently cured and solidified to form the light guiding plate 130. The light entering the light guide 130 can be diffused and evenly distributed by the scattering of the diffusing particles 140. Accordingly, the light guide 130 can have a substantially flat reflective surface 136 without any diffusing structure or diffusing pattern thereon. In addition, the light emitting from the light guide 130 through different openings 122 can represent substantially identical brightness by the effect of the diffusing particles 140. No additional diffusing film or diffusing plate is required in the present embodiment so that the volume of the decoration panel 100 can be thinned.

In addition, the reflective layer 110 disposed opposite to the light shielding pattern layer 120 in the present embodiment is conducive to enhance the decoration effect of the decoration panel 100. In particularly, the light beam emitted from the light emitting device 150 would be transmitted in the light guide 130 after entering the light guide 130. The light can be diffused by the diffusing particles 140 so that a portion of the light may irradiate toward the reflective layer 110. Herein, the reflective layer 110 is capable of reflecting the light such that the light can emit toward the openings 122 and exit from the light guide plate 130 through the light-exiting surface 132. Accordingly, the disposition of the reflective layer 110 is conducive to improve the light utility rate of the decoration panel 100.

More specifically, the light guide 130 can be formed by performing a molding process such as an ejection process. A material of the light guiding plate 130 can be selected from a thermal plastic resin, a thermal curable resin, and the like. In an embodiment, the thermal plastic resin can, for example, include PMMA, PC, polyacetal, PET, PU, etc. and the thermal curable resin can be UV (ultraviolet) curable PMMA, thermal curable silicon, UV curable and thermal curable PU, etc. The materials mentioned in the foregoing are not used for restricting the invention and other material capable of being used in the molding process can be selected. It is noted that the material of the light guide 130 in the present embodiment can be a transparent material so that the light entering the light guide 130 can emit through the openings 122 for achieving the illuminating pattern.

In addition, the light shielding pattern layer 120 of the present embodiment can be printed on the light guide 130, but the invention is not restricted thereto. In another embodiment, the light shielding pattern layer 120 can be formed on a carrier film (not shown) and then adhered on the light guide 130. After the adhering of the light shielding pattern layer 120 on the light guide 130, the carrier film (not shown) can be selectively removed. Accordingly, the decoration panel 100 may further include the carrier film (not shown) and the light shielding pattern layer 120 can be located between the carrier film (not shown) and the light guiding plate 130 in other embodiment.

Figure 3:
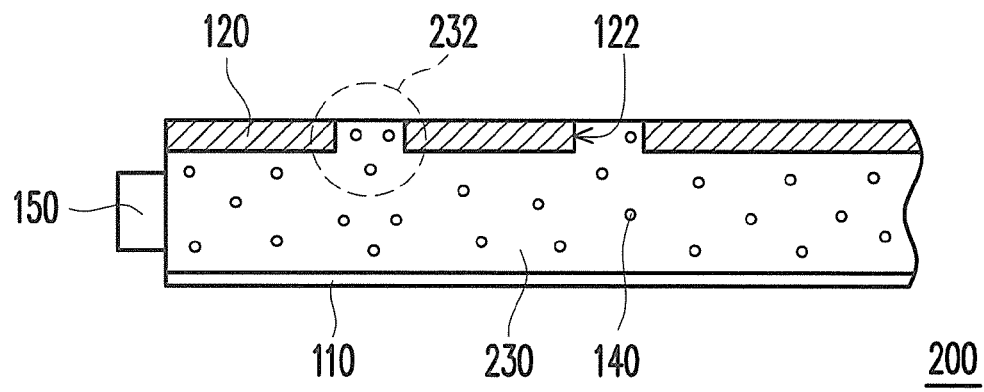
FIG. 3 schematically illustrates a cross-sectional view of a decoration panel according to a second embodiment of the invention.

FIG. 3 schematically illustrates a cross-sectional view of a decoration panel according to a second embodiment of the invention. Referring to FIG. 3, the decoration panel 200, similar to the decoration panel 100 of the first embodiment, includes a reflective layer 110, a light shielding pattern layer 120, a light guide 230, a plurality of diffusing particles 140, and a light emitting device 150. In the present embodiment, the disposition relationship of the reflective layer 110, the light shielding pattern layer 120, the light guide 230, the diffusing particles 140, and the light emitting device 150 is similar to that depicted in the first embodiment. Specifically, the difference between the present embodiment and the first embodiment lies in that the light guide 230 has a plurality of protrusions 232 located at the openings 122 of the light shielding pattern layer 120. In other words, the light shielding pattern layer 120 can be embedded in the light guide 230. It is noted that the amount of the openings 122 and that of the protrusions 232 can be equal so that the amount of the protrusion 232 can be one if the light shielding pattern layer 120 has only one opening 122. It is noted that a surface of light guiding plate 230 away from the reflective layer 110, namely the light-exiting surface, and the light shielding pattern layer 120 can be served as a portion of an outer surface of a device when the decoration panel 200 is applied in a device for decoration.

In the present embodiment, the light guide 230 can be form by a molding process to have the protrusions 232 and the light shielding pattern layer 120 can be placed in the gaps among the protrusions 232. In one embodiment, the light shielding pattern layer 120 can be formed on the light guide 230 by another molding process. Alternately, the light shielding pattern layer 120 can be formed on the light guide 230 by adhering or printing. Furthermore, the light shielding pattern layer 120 can be formed by other process and the invention is not limited thereto.

Figure 4:
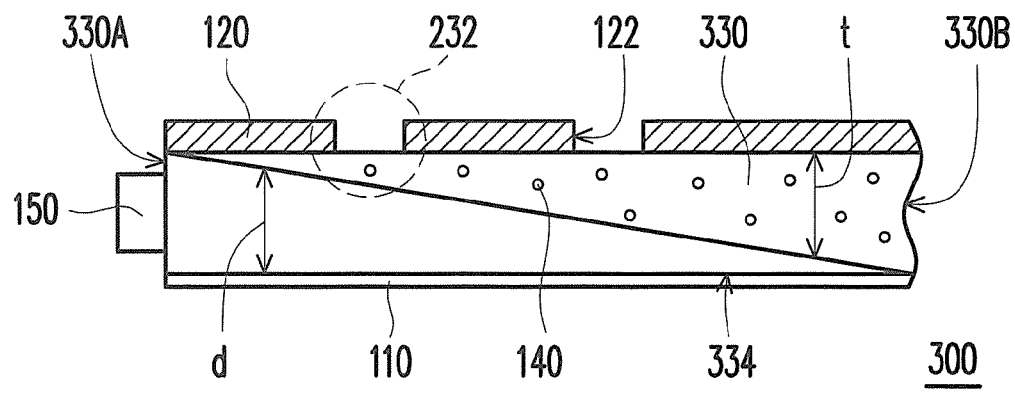
FIG. 4 schematically illustrates a cross-sectional view of a decoration panel according to a third embodiment of the invention.

FIG. 4 schematically illustrates a cross-sectional view of a decoration panel according to a third embodiment of the invention. Referring to FIG. 4, the decoration panel 300, similar to the decoration panel 100 of the first embodiment, includes a reflective layer 110, a light shielding pattern layer 120, a light guide 330, a plurality of diffusing particles 140, and a light emitting device 150. In the present embodiment, the disposition relationship of the reflective layer 110, the light shielding pattern layer 120, the light guide 330, the diffusing particles 140, and the light emitting device 150 is similar to that depicted in the first embodiment. Specifically, the difference between the present embodiment and the first embodiment lies in that the light guide 330 of the present embodiment is a wedge-shaped light guiding plate. In addition, a thickness t of the light guide 330 is gradually increased from a first side 330A of the light guide 330 adjacent to the light emitting device 150 toward a second side 330B opposite to the first side 330A and a distance d from the reflective layer 110 to the light guide 330 is gradually decreased with the increase of the thickness t of the light guiding plate 330. In the present embodiment, a surface of light guide 330 away from the reflective layer 110 and the light shielding pattern layer 120 can be served as a portion of an outer surface of a device when the decoration panel 300 is applied in a device for decoration.

It is noted that the space formed between the reflective layer 110 and the wedge-shaped light guide 330 is, for example, filled with air. A light beam emitted from the light emitting device 150 would pass the boundary between the air and the light guide 330 before entering the light guide 330. Generally, the refractive index of the air is different from the refractive index of the light guide 330. The transmitting direction of the light can be changed by irradiating on the boundary between the air and the light guide 330, which is further conducive to enhance the evenness of the light in the light guide 330. Therefore, the decoration panel 300 can omit the disposition of additional diffusing elements for making the light evenly distributed in the light guide 330 and achieve simple design and thinned volume.

In specific, the wedge-shaped light guide 330 can have a substantially flat reflective surface 334 facing to the reflective layer 110 and no diffusing structure or diffusing pattern is required to be disposed on the substantially flat reflective surface 334. Furthermore, the invention is not limited to the illustrated drawing of FIG. 4. In other embodiments, the light guide 330 can have the protrusions 232 as shown in FIG. 3 and the light shielding pattern layer 120 can be formed by printing, molding ejecting, or the like.

Figure 5:
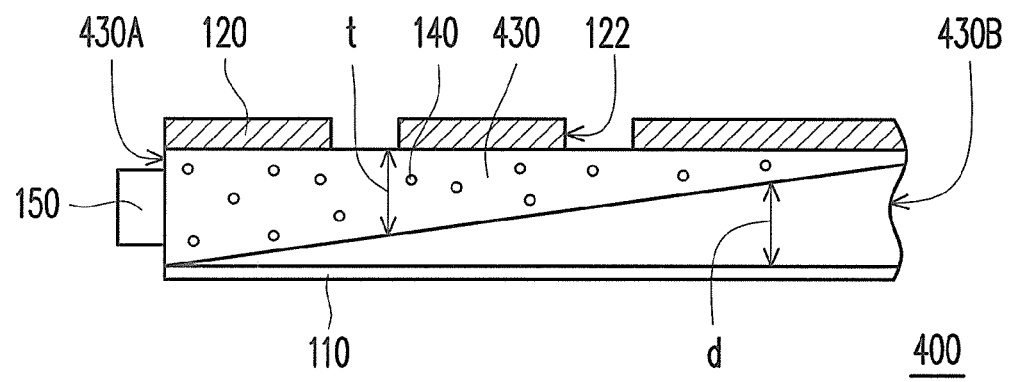
FIG. 5 schematically illustrates a cross-sectional view of a decoration panel according to a fourth embodiment of the invention.

FIG. 5 schematically illustrates a cross-sectional view of a decoration panel according to a fourth embodiment of the invention. Referring to FIG. 5, the decoration panel 400, similar to the decoration panel 100 of the first embodiment, includes a reflective layer 110, a light shielding pattern layer 120, a light guide 430, a plurality of diffusing particles 140, and a light emitting device 150. In the present embodiment, the disposition relationship of the reflective layer 110, the light shielding pattern layer 120, the light guide 430, the diffusing particles 140, and the light emitting device 150 is similar to that depicted in the first embodiment. Specifically, the difference between the present embodiment and the first embodiment lies in that the light guide 430 of the present embodiment is a wedge-shaped light guiding plate. In addition, a surface of light guide 430 away from the reflective layer 110 as well as the light shielding pattern layer 120 can also be served as a portion of an outer surface of a device when the decoration panel 400 is applied in a device for decoration.

In addition, in the present embodiment, a thickness t of the light guide 430 is gradually decreased from a first side 430A of the light guide 430 adjacent to the light emitting device 150 toward a second side 430B opposite to the first side 430A. Furthermore, a distance d from the reflective layer 110 to the light guide 430 is, on the contrary, gradually increased with the decrease of the thickness t of the light guide 430. Similar to the third embodiment, the wedge-shaped light guide 430 conduces to change the transmission direction of the light beam emitted from the light emitting device 150. Therefore, the decoration panel 400 can have even brightness represented in different openings 122 without disposing any additional diffusing element therein. In specific, the wedge-shaped light guide 430 can have a substantially flat reflective surface (not marked) facing to the reflective layer 110 and no diffusing structure or diffusing pattern is required to be disposed on the substantially flat reflective surface.

Figure 6:
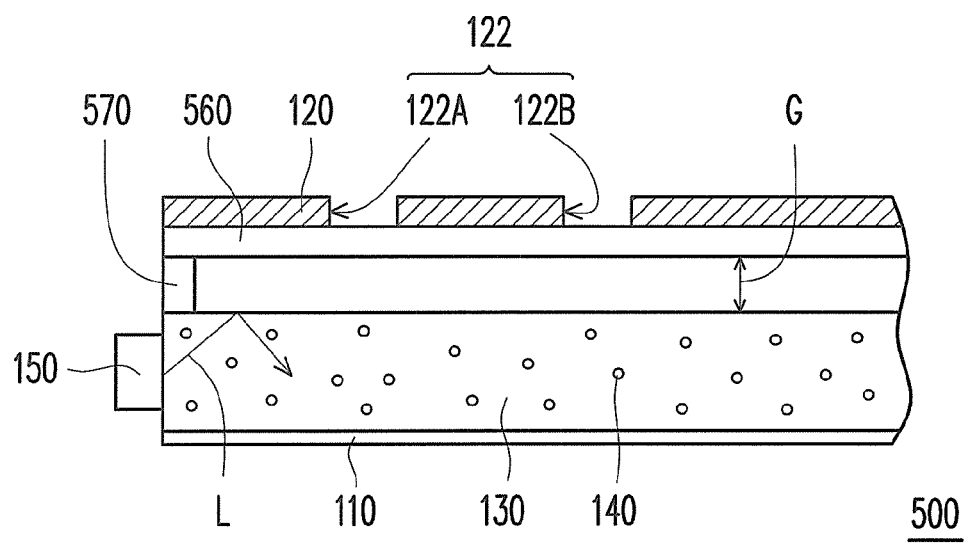
FIG. 6 schematically illustrates a cross-sectional view of a decoration panel according to a fifth embodiment of the invention.

FIG. 6 schematically illustrates a cross-sectional view of a decoration panel according to a fifth embodiment of the invention. Referring to FIG. 6, the decoration panel 500, similar to the decoration panel 100 of the first embodiment, includes a reflective layer 110, a light shielding pattern layer 120, a light guide 130, a plurality of diffusing particles 140, and a light emitting device 150. In the present embodiment, the disposition relationship of the reflective layer 110, the light shielding pattern layer 120, the light guide 130, the diffusing particles 140, and the light emitting device 150 is similar to that depicted in the first embodiment. Specifically, the difference between the present embodiment and the first embodiment lies in that the decoration panel 500 further includes a film layer 560 and an adhesion 570. In the present embodiment, the light shielding pattern layer 120 can be served as a portion of an outer surface of a device when the decoration panel 500 is applied in a device for decoration.

In the present embodiment, the light shielding pattern layer 120 is disposed on the film layer 560 and an air gap G is formed between the film layer 560 and the light guide 130. Specifically, the adhesion 570 is disposed between the light guide 130 and the film layer 560 and located at a periphery of the film layer 560. Accordingly, the air gap G is demarcated by the adhesion 570, the light guide 130, and the film layer 560.

Usually, the refractive index of the air is smaller than the refractive index of the light guide 130. The light beam L transmitted in the light guiding plate 130 can be subjected to the total inner reflection at the boundary between the air gap G and the light guide 130 when the light beam L is transmitted in a direction included the boundary at an angle larger than a critical angle. Accordingly, the light beam L can be transmitted farther from the light emitting device 150, which is conducive to even the emitting light of the decoration panel 500.

Specifically, the opening 122A is relative closer to the light emitting device 150 than the opening 122B. Under this circumstance, the brightness representing in the location of the opening 122A can be greater than that representing in the location of the opening 122B, which may cause the unevenness of illumination. By configuring the air gap G between the light guide 130 and the light shielding pattern layer 120, the light beam L emitted from the light emitting device 150 in the present embodiment can be subjected to the total inner reflection for rendering brightness representing in the location of the opening 122A substantially identical to that representing in the location of the opening 122B. Therefore, the air gap G is helpful for improving the illumination effect of the decoration panel 500. Since the illumination of the decoration panel 500 is uniformed, no additional diffusing structure or diffusing particle is required to be disposed on the side of the light guide 130 facing to the reflective layer 110 and thus the light guide 130 can have a substantially flat surface (not marked) facing to the reflective layer 110. In addition, the air gap G in the present embodiment is conducive to reduce the light absorption of the light shielding pattern layer 120 so that the light utility rate can be enhanced.

Figure 7:
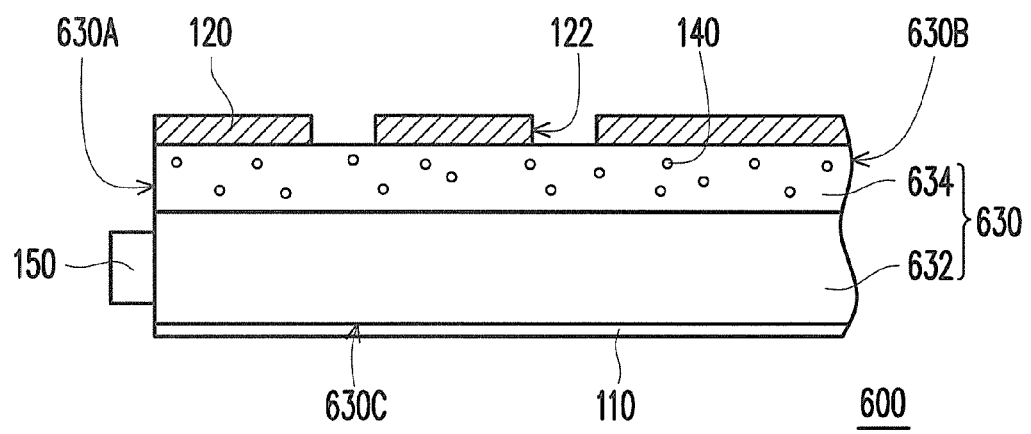
FIG. 7 schematically illustrates a cross-sectional view of a decoration panel according to a sixth embodiment of the invention.

FIG. 7 schematically illustrates a cross-sectional view of a decoration panel according to a sixth embodiment of the invention. Referring to FIG. 7, the decoration panel 600 includes a reflective layer 110, a light shielding pattern layer 120, a light guide 630, a plurality of diffusing particles 140, and a light emitting device 150. In the present embodiment, the disposition relationship of the reflective layer 110, the light shielding pattern layer 120, the light guide 630, the diffusing particles 140, and the light emitting device 150 is similar to that depicted in the first embodiment. Specifically, the difference between the present embodiment and the first embodiment lies in that the light guide 630 includes a first portion 632 and a second portion 634 located between the light shielding pattern layer 120 and the first portion 632. Moreover, the light emitting device 150 in the present embodiment is located beside the first portion 632 of the light guiding plate 630 and the diffusing particles 140 are distributed within the second portion 634. In the present embodiment, the light shielding pattern layer 120 and a surface of the second portion 624 away from the first portion 632 can be served as a portion of an outer surface of a device when the decoration panel 600 is applied in a device for decoration.

The light beam emitted from the light emitting device 150 passes the first portion 632 prior to the second portion 634. In addition, the first refractive index of the first portion 632 is, for instance, greater than a second refractive index of the second portion 634 in the present embodiment. Therefore, the light irradiating on the boundary of the first portion 632 and the second portion 634 can be subjected to the total inner reflection. One of the openings 122 farther from the light emitting device 150 than others can represent substantially identical brightness to said others. In short, the decoration panel 600 can have desirable illuminating patterns and provide favorable visual effect.

In addition, a plurality of diffusing particles 140 is distributed in the second portion 634 of the light guide 630. The light transmitted in the second portion 642 of the light guide 630 can be evenly distributed so as to make the decoration panel 600 having desirable illuminating effect. Therefore, no additional diffusing elements are required and the volume of the decoration panel 600 can be reduced, especially in thickness. In an alternative embodiment, the first portion 362 and the second portion 634 of the light guide 630 can be respectively formed in a wedged-shape. Accordingly, a thickness of the second portion 634 of the light guide 630 can be gradually increased from a first side 630A of the light guide 630 toward a second side 630B opposite to the first side 630A and a distance from the reflective surface 630C to the second portion 634 of the light guide 630 can be gradually decreased with the increase of the thickness of the second portion 634 of the light guide 630, and one of the first side 630A and the second side 630B contains the side surface. Nevertheless, the light guide 630 described in the forgoing is not intent to construed as limited the invention.

Figure 8:
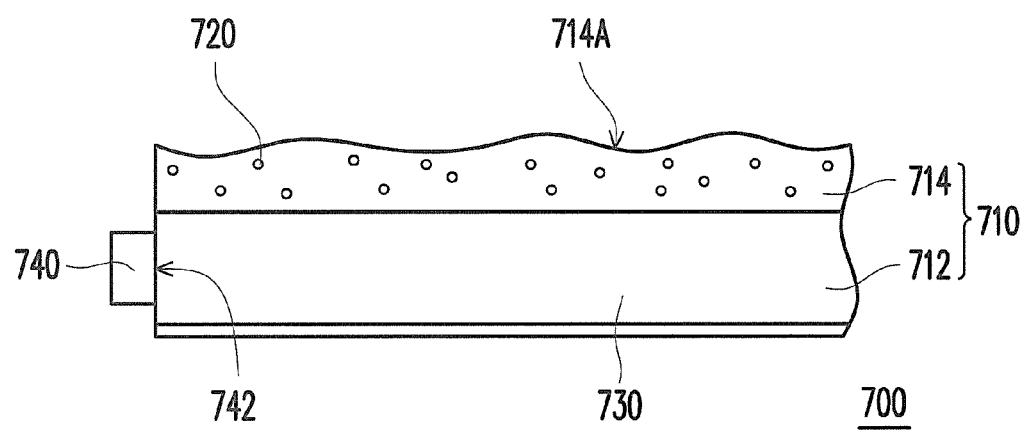
FIG. 8 schematically illustrates a cross-sectional view of a decoration panel according to a seventh embodiment of the invention.

FIG. 8 schematically illustrates a cross-sectional view of a decoration panel according to a seventh embodiment of the invention. Referring to FIG. 8, the decoration panel 700 includes a light guide 710, a plurality of diffusing particles 720, a reflective layer 730, and a light emitting device 740. The light guide 710 includes a first portion 712 and a second portion 714 connected to the first portion 712. The diffusing particles 720 are distributed within the second portion 714 of the light guide 710. The reflective layer 730 is disposed at a side of the first portion 712 away from the second portion 714. The light emitting device 740 is disposed beside the first portion 712 of the light guiding plate 710 and the light emitting device 740 can be a light bar, a lamp, or a cold cathode lamp.

In the present embodiment, the light emitting device 740 is used for providing light to achieve the illumination of the decoration panel 700. Therefore, the light beam emitted from the light emitting device 740 is predetermined to entering the light guide 710. Specifically, the light emitting device 740 has a light emitting surface 742 substantially perpendicular to the reflective layer 730 so that the light emitted beam from the light emitting device 740 can enter the light guide 710 through a side surface (not marked) and then exit from a side of the second portion 714 away from the first portion 712, namely the light-exiting surface 714A.

In addition, for facilitating the required visual effect, the second portion 714 in the present embodiment has an uneven surface 714A away from the first portion 712. It is noted that the uneven surface 714A away from the first portion 712 can be served as a portion of an outer surface of a device when the decoration panel 700 is applied in a device for decoration. The uneven surface 714A can, for instance, be a wavy surface so that a user can have a sense of wave when watching the decoration panel 700. However, the wavy surface is not intent to limit the invention. In other embodiments, the uneven surface 714A can be formed in any non-flat manner or be a three dimensional structure.

Similar to the sixth embodiment depicted in the foregoing, a first refractive index of the first portion 712 is greater than a second refractive index of the second portion 714. Therefore, the light beam emitted from the light emitting device 740 can be evenly distributed and emitted from the light guide 710. No additional diffusing elements are needed in the present embodiment, which is conducive to reduce the volume of the decoration panel 700. In addition, the firs portion 712 and the second portion 714 of the light guide 710 can be respectively formed in wedged-shape. In short, the decoration effect, the thinned volume, and the illuminating effect can be simultaneously accomplished in the decoration panel 700.

Figure 9:
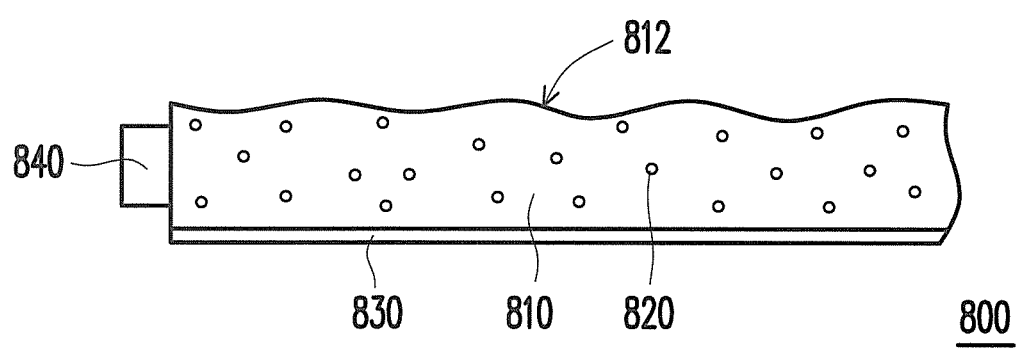
FIG. 9 schematically illustrates a cross-sectional view of a decoration panel according to an eighth embodiment of the invention.

FIG. 9 schematically illustrates a cross-sectional view of a decoration panel according to an eighth embodiment of the invention. Referring to FIG. 9, the decoration panel 800 includes a light guide 810, a plurality of diffusing particles 820, a reflective layer 830, and a light emitting device 840. The diffusing particles 820 are distributed within the light guiding plate 810. The reflective layer 830 and the light emitting device 840 are respectively disposed at two adjacent sides of the light guiding plate 810. The light emitting device 840 can be a light bar, a lamp, or a cold cathode lamp.

Similar to the seventh embodiment, the light beam emitted from the light emitting device 840 is predetermined to entering the light guiding plate 810. For facilitating the required visual effect, the light guiding plate 810 in the present embodiment has an uneven surface 812 away from the reflective layer 830. The uneven surface 812 can, for instance, be a wavy surface so that a user can have a sense of wave when watching the decoration panel 800. Furthermore, the disposition of the diffusing particles 820 is conducive to render the illumination of the decoration panel 800 even and facilitates desirable visual effect. It noted that the uneven surface 812 can be served as a portion of an outer surface of a device or the housing of the device when the decoration panel 600 is applied in a device for decoration.

However, the wavy surface is not intent to limit the invention. In other embodiments, the uneven surface 812 can be formed in any non-flat manner. In an alternate embodiment, the light guide 810 may has a substantially flat surface away from the reflective layer 830 and the invention is not limited thereto.

In Summary, the light guiding plate of the invention is configured with a plurality of diffusing particles and a light emitting device is disposed beside the light guiding plate. The decoration panel is capable of uniformed illuminating without additional light diffusing elements so as to have a thinned volume. In addition, a reflective layer disposed at the reflective surface of the light guiding plate is conducive to enhance the illumination brightness of the decoration panel and enhance the light utility rate thereof. Accordingly, the decoration panel can have at least the characteristics of thinned volume, simple structure, and desirable light illuminating effect.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A decoration panel comprising:
   a light guide with a plurality of diffusing particles distributed therein, the light guide having a side surface, a reflective surface, and a light-exiting surface, wherein a light enters the light guide through the side surface;
   a reflective layer disposed on the reflective surface, for reflecting the light to the light-exiting surface; and
   a light shielding pattern layer disposed on the light-exiting surface, wherein the light shielding pattern layer has at least one opening;
   wherein the light-exiting surface is uneven and forms a portion of an outer surface of a housing.

2. The decoration panel according to claim 1, wherein the reflective surface is substantially flat.

3. The decoration panel according to claim 1, wherein the light guide has at least one protrusion located at the opening of the light shielding pattern layer.

4. The decoration panel according to claim 1, wherein the light shielding pattern layer is an ink pattern layer and is printed on the light guide.

5. The decoration panel according to claim 1, further comprising a film layer, wherein the light shielding pattern layer is disposed on the film layer.

6. The decoration panel according to claim 5, further comprising an adhesion disposed between the light guide and the film layer and located at a periphery of the film layer so that an air gap is formed between the film layer and the light guide.

7. The decoration panel according to claim 1, wherein the light guide comprises a first portion and a second portion connected to the first portion, wherein a first refractive index of the first portion is greater than a second refractive index of the second portion, and the diffusing particles are distributed within the second portion.

8. The decoration panel according to claim 7, wherein a thickness of the second portion of the light guide is gradually increased from a first side of the light guide toward a second side opposite to the first side and a distance from the reflective surface to the second portion of the light guide is gradually decreased with the increase of the thickness of the second portion of the light guide, and one of the first side and the second side contains the side surface.

9. A light guide module capable of illuminating and being applied in a device for decoration, the light guide module comprising:
- a light source;
- a light guide with a plurality of diffusing particles distributed therein, the light guide having a side surface, a reflective surface, and a light-exiting surface, wherein a light provided by the light source enters the light guide through the side surface;
- a reflective layer disposed on the reflective surface, for reflecting the light to the light-exiting surface; and
- a light shielding pattern layer, disposed on the light-exiting surface, wherein the light shielding pattern layer has at least one opening;
- wherein the light guide forms a portion of an outer surface of the device.

10. The light guide module according to claim 9, further comprising a film layer, wherein the light shielding pattern layer is disposed on the film layer.

11. The light guide module according to claim 10, further comprising an adhesion disposed between the light guide and the film layer and located at a periphery of the film layer so that an air gap is formed between the film layer and the light guide.

12. The light guide module according to claim 9, wherein the light guide has at least one protrusion located at the opening of the light shielding pattern layer.

13. The light guide module according to claim 9, wherein the light shielding pattern layer is an ink pattern layer and is printed on the light guide.

14. The light guide module according to claim 9, wherein the light guide comprises a first portion and a second portion connected to the first portion, wherein a first refractive index of the first portion is greater than a second refractive index of the second portion, and the diffusing particles are distributed within the second portion.

15. The light guide module according to claim 14, wherein a thickness of the second portion of the light guide is gradually increased from a first side of the light guide toward a second side opposite to the first side and a distance from the reflective surface to the second portion of the light guide is gradually decreased with the increase of the thickness of the second portion of the light guide, and one of the first side and the second side contains the side surface.

16. The light guide module according to claim 15, wherein the light source is disposed beside the light guide on the first side or the second side.

17. The light guide module according to claim 9, wherein the reflective surface is substantially flat.

18. The decoration panel according to claim 9, wherein the light-exiting surface is uneven.

* * * * *